(12) United States Patent
Mukherjee et al.

(10) Patent No.: US 12,361,354 B2
(45) Date of Patent: Jul. 15, 2025

(54) ENERGY OPTIMIZATION PLATFORM USING ARTIFICIAL INTELLIGENCE AND EDGE COMPUTING

(71) Applicant: Bank of America Corporation, Charlotte, NC (US)

(72) Inventors: Maharaj Mukherjee, Poughkeepsie, NY (US); George Albero, Charlotte, NC (US); Jinna Kim, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 234 days.

(21) Appl. No.: 17/948,621

(22) Filed: Sep. 20, 2022

(65) Prior Publication Data
US 2024/0095628 A1    Mar. 21, 2024

(51) Int. Cl.
*G06Q 10/0631*   (2023.01)
*G06Q 30/0201*   (2023.01)
*G06Q 50/06*     (2024.01)
*H02J 3/00*      (2006.01)
*H02J 3/14*      (2006.01)

(52) U.S. Cl.
CPC ... *G06Q 10/06315* (2013.01); *G06Q 30/0206* (2013.01); *G06Q 50/06* (2013.01); *H02J 3/003* (2020.01); *H02J 3/144* (2020.01)

(58) Field of Classification Search
None
See application file for complete search history.

(56) References Cited

U.S. PATENT DOCUMENTS

| | | | |
|---|---|---|---|
| 9,104,435 B2 | 8/2015 | Potkonjak |
| 9,326,236 B2 | 4/2016 | Ligman et al. |
| 9,326,237 B2 | 4/2016 | Ligman et al. |
| 9,552,234 B2 | 1/2017 | Boldyrev et al. |
| 9,648,636 B2 | 5/2017 | Elfstrom et al. |
| 10,110,003 B2 | 10/2018 | Stalker |
| 10,290,289 B2 | 5/2019 | Jahagirdar et al. |
| 10,331,191 B2 | 6/2019 | Potkonjak |
| 10,490,170 B2 | 11/2019 | Jahagirdar et al. |
| 10,660,241 B2 | 5/2020 | Brunstetter |
| 10,705,580 B2 | 7/2020 | Gross et al. |
| 10,732,584 B2 | 8/2020 | ElBsat et al. |
| 11,022,947 B2 | 6/2021 | ElBsat et al. |
| 11,068,821 B2 | 7/2021 | Wenzel et al. |

(Continued)

*Primary Examiner* — Folashade Anderson
(74) *Attorney, Agent, or Firm* — Banner & Witcoff, Ltd.

(57) ABSTRACT

Aspects of the disclosure relate to energy optimization. A computing platform may receive an event processing request. The computing platform may identify parameters of the event processing request. The computing platform may input the parameters into a global energy optimization model, to identify an edge computing system at which to process the event processing request. The computing platform may route the event processing request to the edge computing system along with commands to process the event processing request using an energy mix identified by a local energy optimization model, corresponding to the edge computing system, which may cause the edge computing system to: input the parameters of the event processing request into the local energy optimization model to identify the energy mix, and process, using the energy mix, the event processing request.

20 Claims, 8 Drawing Sheets

(56) References Cited

U.S. PATENT DOCUMENTS

| | | |
|---|---|---|
| 11,081,091 B2 | 8/2021 | Jahagirdar et al. |
| 11,159,022 B2 | 10/2021 | Lee et al. |
| 11,163,271 B2 | 11/2021 | Lee et al. |
| 11,182,714 B2 | 11/2021 | Wenzel et al. |
| 11,226,125 B2 | 1/2022 | Hogan et al. |
| 11,424,643 B2 | 8/2022 | Islam et al. |
| 2019/0372345 A1* | 12/2019 | Bain ................ G06Q 30/0601 |
| 2020/0327371 A1* | 10/2020 | Sharma ................ H04L 67/34 |
| 2022/0114010 A1* | 4/2022 | Guim Bernat ...... G06F 9/45558 |
| 2023/0222388 A1* | 7/2023 | Cella ..................... G06N 20/00 |
| | | 706/12 |

* cited by examiner

ENERGY OPTIMIZATION PLATFORM USING ARTIFICIAL INTELLIGENCE AND EDGE COMPUTING

BACKGROUND

Aspects of the disclosure relate to energy optimization. Event processing may be delayed due to intermittency, outages, and/or other local energy issues. Accordingly, it may be important to route requests to various different processing systems to reduce delay. It may be difficult, however, to identify optimal alternatives, in light of the constant fluctuation of energy availability and request parameters. Accordingly, it may be advantageous to train, generate, and/or otherwise host a model to identify such optimal solutions, while balancing the limitations of computing resources such as available memory, processing power, and/or other resources, and the limitations of event processing, such as time/computational delays and energy cost.

SUMMARY

Aspects of the disclosure provide effective, efficient, scalable, and convenient technical solutions that address and overcome the technical problems associated with optimized energy source selection. In accordance with one or more embodiments of the disclosure, a computing platform comprising at least one processor, a communication interface, and memory storing computer-readable instructions may receive a first event processing request. The computing platform may identify first parameters of the first event processing request. The computing platform may input the first parameters into a global energy optimization model, which may cause the global energy optimization model to identify a first edge computing system at which to process the first event processing request. The computing platform may route the first event processing request to the first edge computing system along with one or more commands directing the first edge computing system to process the first event processing request using a first energy mix identified by a first local energy optimization model, corresponding to the first edge computing system, which may cause the first edge computing system to: 1) input the first parameters of the first event processing request into the first local energy optimization model to identify the first energy mix, and 2) process, using the first energy mix, the first event processing request.

In one or more instances, the computing platform may train the global energy optimization model, by inputting parameters for historical event processing requests, historical energy pricing information, and historical processing capacity for a plurality of edge computing systems including the first edge computing system. In one or more instances, the parameters may include one or more of: time sensitivity, value, and necessary processing power.

In one or more examples, each of the plurality of edge computing systems may be located in a different geographic region. In one or more examples, identifying a first edge computing system at which to process the first event processing request may include identifying an edge computing system currently configured to process the first event processing request for the lowest cost, when compared to other edge computing systems, within a predetermined timeframe.

In one or more instances, the computing platform may train one or more local energy optimization models configured to identify, based on parameters of the event processing requests, an energy mix to process the corresponding event processing requests, which may include inputting parameters for historical event processing requests, historical energy pricing information, and historical processing capacity for a plurality of edge computing systems including the first edge computing system. In one or more instances, the global energy optimization model and the one or more local energy optimization models may be a single model.

In one or more examples, the plurality of edge computing systems may be integrated into the computing platform. In one or more examples, the first energy mix comprises one or more energy sources, each being different types of energy sources.

In one or more instances, the computing platform may direct one or more energy sources, corresponding to the first energy mix, to provide energy to the computing platform, which may cause the one or more energy sources to provide the energy to the computing platform. In one or more instances, the computing platform may update, by inputting the first parameters, the first edge computing system, and the first energy mix, the global energy optimization model and the first local energy optimization model.

In one or more examples, the computing platform may identify that an accuracy level of the global energy optimization model and the first local energy optimization model has reached a threshold accuracy level. Based on identifying that the accuracy level has reached the threshold accuracy level, the computing platform may halt updates to the global energy optimization model and the first local energy optimization models until the accuracy level falls below the threshold accuracy level. In one or more examples, the computing platform may receive, from a user device, an energy mix preference input, specifying one or more energy sources to be included in the first energy mix, which may cause a backend table of preferred energy sources for the corresponding user to be updated so as to include the particular energy source.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe using artificial intelligence (AI) and edge computing for energy optimization. Edge computing may be leveraged to solve for potential energy outages and intermittency, sourcing various type of energy globally, and thus reducing cost by optimizing the mix of available energy sources at the best/most practical times.

Using edge computing, energy needs may be routed to sources of greener energy and/or renewables, mixed with traditional energy sources. Because green/renewable energy sources can change depending on type and location, using edge computing, energy flow may be adjusted to utilize the greenest source available at the specific time of need for the specific job/work. Solar power, for example, may be dependent on the sun, and it may be sunny somewhere in the world at any given time. By using edge computing, we may leverage solar power 24/7. If there is surplus, then edge computing may be used to re-route the excess energy to where it is needed next or store the energy appropriately if the energy type is storable. For example, some renewable energy sources such as wind may be difficult to store, so can only be used temporarily or for a limited period.

Where and how much energy is being used at any given time globally may be mapped. Edge computing may solve for intermittency and potential outages typically seen in renewal energy sources such as solar, wind, hydro, and/or other sources. Edge computing may also be used to store renewable energy such as ocean energy. Weather forecasting (both short and long term weather patterns), time/season, and geo-location data may be utilized. Computations may be adjusted for simple and complex problems (e.g., immediate or emergency solutions may need quick computations needing traditional energy sources). If there is some, but not enough, green energy immediately available to fully complete a time sensitive job, then edge computing may route to multiple energy sources so that the mix of energy used, for example, may be a percentage of fossil fuels plus percentage of renewables.

If a problem is complex and multi-pronged, then AI may be leveraged to break it up into various pieces that need different processing times with some solutions being auto-decisioned while others may be sent for manual review. If longer computations are needed, then AI may forward those onto edge computing for faster processing. AI coupled with edge computing may potentially solve for ranges of less predictable factors such as unplanned impacts of climate change, natural or manmade weather disasters (wildfires, flooding, etc.), and better or worse harvests. Together, AI and edge computing may help prioritize resources based on real-time availability and reliability of energy outputs based on region/geography regardless of politics and unpredictability.

Currently, most traditional energy sources rely on a single or very few utility providers, thus causing unintended negative downstream impacts especially when monopolized or politicized. The systems and methods described herein may allow organizations to be vendor agnostic and reduce time in business negotiations. Similarly, they may permit usage of energy mixes previously unavailable because edge computing itself might not need locality and co-location. Edge computing may be leveraged to indicate the best mix of energy, and where/when energy that is needed the most may be locally sourced. In addition, efficiency of scaling and closer to real-time computations may be improved. This may be used by one location, building, city, state, country, and/or other region because of the routing algorithm.

Figure 1A:
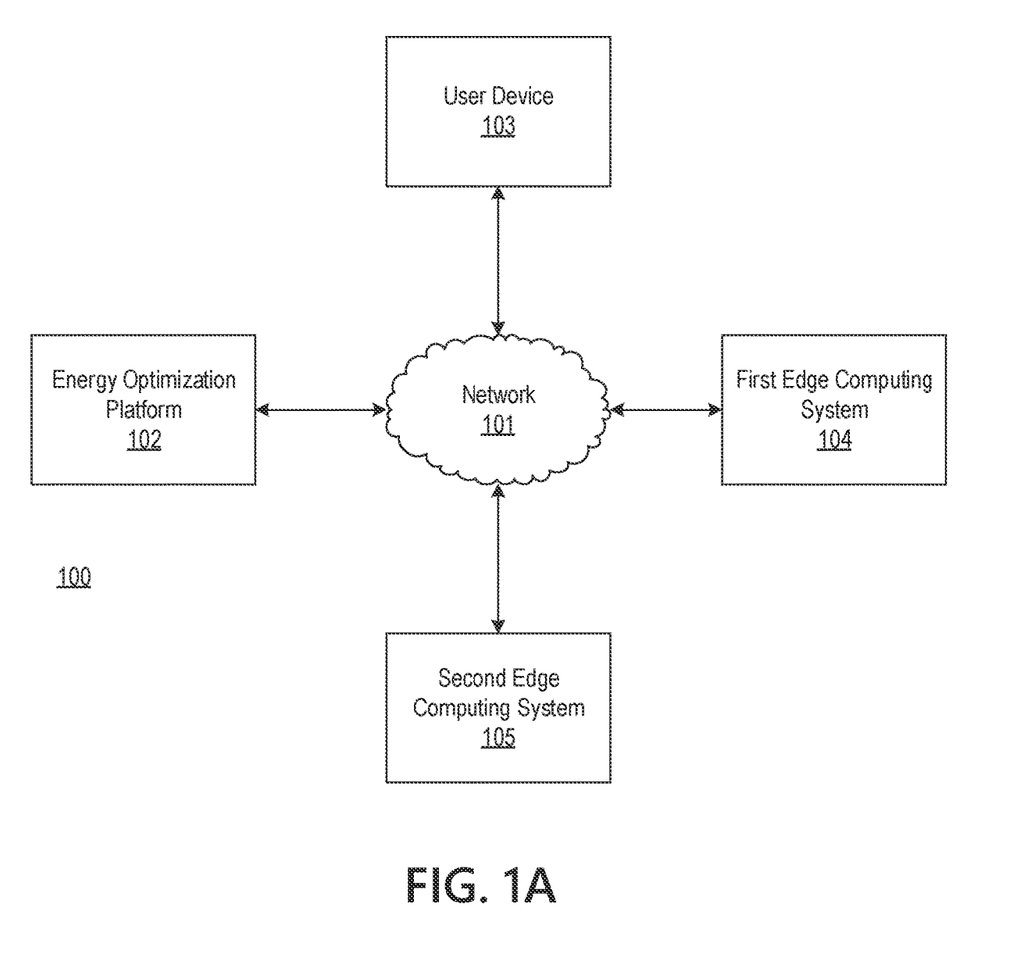
FIGS. 1A-1B depict an illustrative computing environment for energy optimization using artificial intelligence (AI) and edge computing in accordance with one or more example embodiments.
Figure 1B:
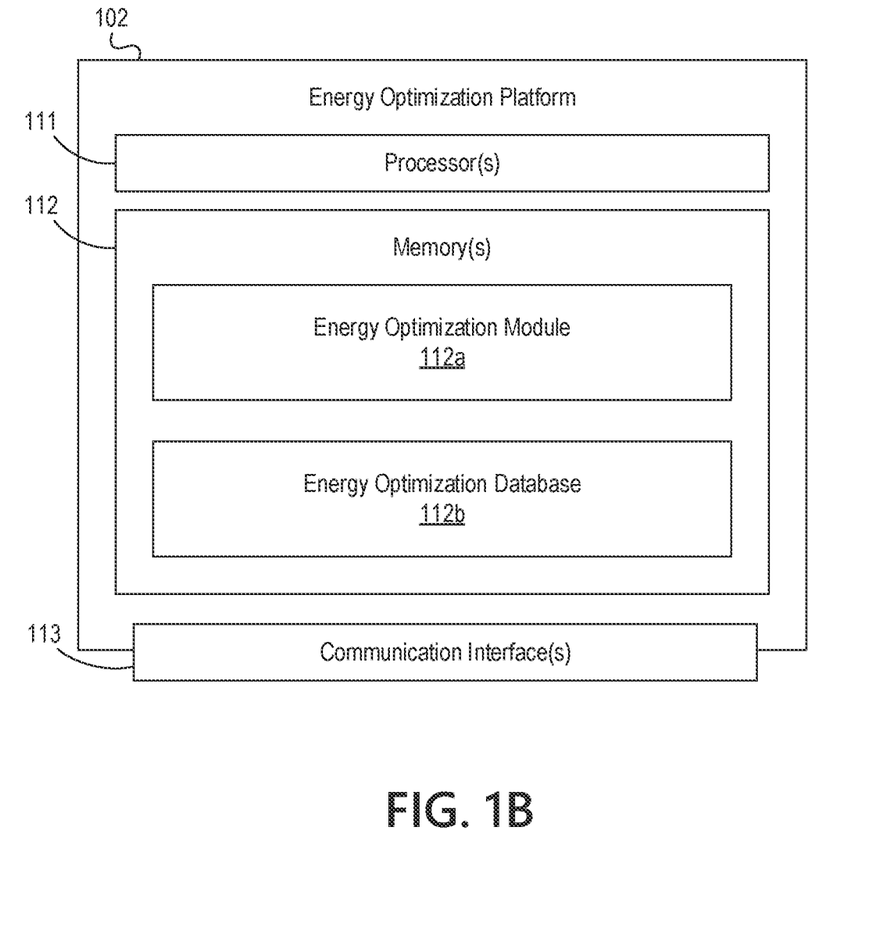

FIGS. 1A-1B depict an illustrative computing environment for energy optimization using AI and edge computing in accordance with one or more example embodiments. Referring to FIG. 1A, computing environment 100 may include one or more computer systems. For example, computing environment 100 may include an energy optimization platform 102, a user device 103, a first edge computing system 104, and a second edge computing system 105.

As described further below, energy optimization platform 102 may be a computer system that includes one or more computing devices (e.g., servers, server blades, or the like) and/or other computer components (e.g., processors, memories, communication interfaces) that may be used to train, host, and/or otherwise refine a global energy optimization model, which may, e.g., be trained to identify optimal edge nodes at which to process event processing requests (e.g., stock trades, fund transfers, balance inquiries, mortgage applications, loan applications, and/or other requests). In these instances, optimization of the edge nodes may refer to one or more edge nodes configured to process the event processing requests within a predetermined time period (e.g., a maximum specified processing time) for the lowest energy cost. In these instances, the global energy optimization model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing, hybrid quantum computing, and/or other models.

User device 103 may be a mobile device, tablet, smartphone, desktop computer, laptop computer, and/or other device that may be used by an individual (e.g., a client of a financial institution, investor, enterprise employee and/or other individual) to input an event processing request (e.g., stock trades, fund transfers, balance inquiries, mortgage applications, loan applications, and/or other requests). In some instances, the user device 103 may be configured to provide one or more user interfaces (e.g., energy optimization interfaces, event processing interfaces, or the like).

First edge computing system 104 may include one or more computing devices (e.g., servers, server blades, and/or other devices) and/or other computer components (e.g., processors, memories, communication interfaces). In some instances, first edge computing system 104 may be configured to support processing of event processing requests in a particular geographic region. As described herein, event processing requests from various other geographic regions may similarly be routed to the first edge computing system 104 for processing. In some instances, the first edge computing system 104 may train, host, and/or otherwise maintain a local energy optimization model, configured to identify an optimal energy mix for use in processing requests. In these instances, the local energy optimization model may be a model similar to those types described above with regard to the global energy optimization model. In these instances, optimization of the energy mix may refer to an energy mix that enables processing of the event processing requests within a predetermined time period (e.g., a maximum specified processing time) for the lowest energy cost. Although illustrated as being distinct from the energy optimization platform 102, in some instances, the first edge computing system 104 may be integrated into or otherwise affiliated with the energy optimization platform 102 without departing from the scope of the disclosure.

Second edge computing system 105 may include one or more computing devices (e.g., servers, server blades, and/or other devices) and/or other computer components (e.g., processors, memories, communication interfaces). In some instances, second edge computing system 105 may be configured to support processing of event processing requests in a particular geographic region (e.g., different than the geographic region of the first edge computing system 104). As described herein, event processing requests from various other geographic regions may similarly be routed to the second edge computing system 105 for processing. In some instances, the second edge computing system 105 may train, host, and/or otherwise maintain a local energy optimization model, configured to identify an optimal energy mix for use in processing requests. In these instances, the local energy optimization model may be a model similar to those types described above with regard to the global energy optimization model. In these instances, optimization of the energy mix may refer to an energy mix that enables processing of the event processing requests within a predetermined time period (e.g., a maximum specified processing time) for the lowest energy cost. Although illustrated as being distinct from the energy optimization platform 102, in some instances, the second edge computing system 105 may be integrated into or otherwise affiliated with the energy optimization platform 102 without departing from the scope of the disclosure.

Computing environment 100 also may include one or more networks, which may interconnect energy optimization platform 102, user device 103, first edge computing system 104, second edge computing system 105, or the like. For example, computing environment 100 may include a network 101 (which may interconnect, e.g., energy optimization platform 102, user device 103, first edge computing system 104, second edge computing system 105, or the like).

In one or more arrangements, energy optimization platform 102, user device 103, first edge computing system 104, and/or second edge computing system 105 may be any type of computing device capable of sending and/or receiving requests and processing the requests accordingly. For example, energy optimization platform 102, user device 103, first edge computing system 104, second edge computing system 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of energy optimization platform 102, user device 103, first edge computing system 104, and/or second edge computing system 105 may, in some instances, be special-purpose computing devices configured to perform specific functions.

Referring to FIG. 1B, energy optimization platform 102 may include one or more processors 111, memory 112, and communication interface 113. A data bus may interconnect processor 111, memory 112, and communication interface 113. Communication interface 113 may be a network interface configured to support communication between energy optimization platform 102 and one or more networks (e.g., network 101, or the like). Memory 112 may include one or more program modules having instructions that when executed by processor 111 cause energy optimization platform 102 to perform one or more functions described herein and/or one or more databases that may store and/or otherwise maintain information which may be used by such program modules and/or processor 111. In some instances, the one or more program modules and/or databases may be stored by and/or maintained in different memory units of energy optimization platform 102 and/or by different computing devices that may form and/or otherwise make up energy optimization platform 102. For example, memory 112 may have, host, store, and/or include energy optimization module 112a and an energy optimization database 112b.

Energy optimization module 112a may have instructions that direct and/or cause energy optimization platform 102 to execute advanced techniques to identify optimal resources for energy optimization in event processing. In some instances, the energy optimization module 112a may include one or more energy optimization models (e.g., global energy optimization models configured to route requests based on region, local energy optimization models configured to identify optimal local energy source mixes, and/or other models). Energy optimization database 112b may store information used by energy optimization module 112a and/or energy optimization platform 102 to identify optimal resources for energy optimization, and/or in performing other functions.

Figure 2A:
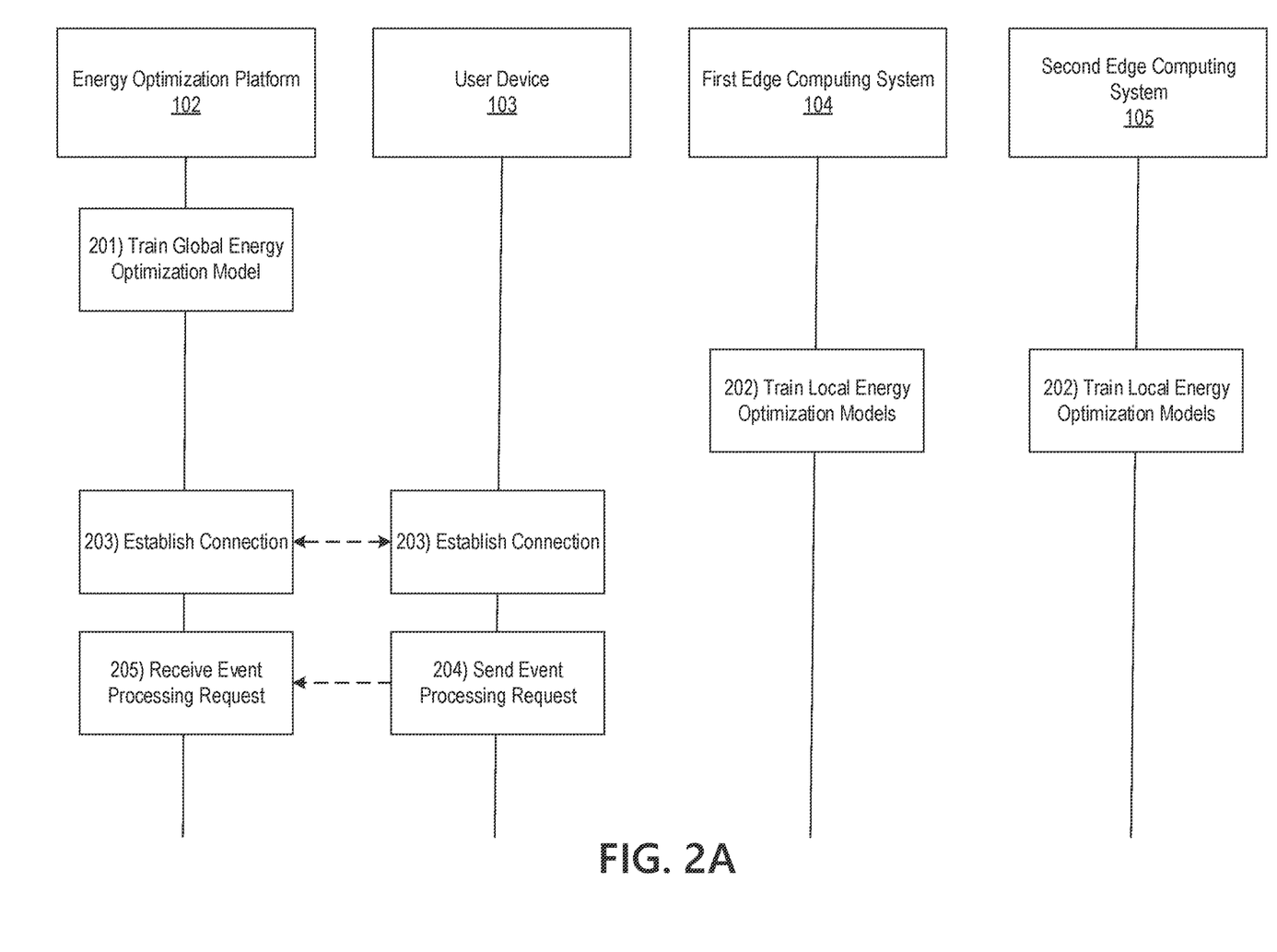
FIGS. 2A-2D depict an illustrative event sequence for energy optimization using AI and edge computing in accordance with one or more example embodiments.

FIGS. 2A-2D depict an illustrative event sequence for energy optimization using AI and edge computing in accordance with one or more example embodiments. Referring to FIG. 2A, at step 201, the energy optimization platform 102 may train a global energy optimization model. For example, the energy optimization platform 102 may train a model configured to input parameters of an event processing request, and identify, based on the parameters, whether or not the event processing request may be routed to an edge computing system for processing or must be locally processed. To do so, the global optimization model may input a number of historical event processing requests, the corresponding parameters (e.g., necessary processing power, time limitations, value, event type, and/or other information), historical energy pricing information, historical processing capacity for various edge computing systems, information indicating whether or not such requests may be pushed for edge processing, weather information, geographic information, climate information, and/or other information. For example, training the global energy optimization model may cause the global energy optimization model to establish a time limitation threshold, where event processing requests with time limitations (e.g., a time in which the event must be processed) below the time limitation threshold, are not sent for edge processing, whereas event processing requests with time limitations that meet or exceed the time limitation threshold may be sent for edge processing.

Additionally, the global energy optimization model may be trained to identify, in instances where the event processing request may be routed to an edge computing system for processing, which edge computing system may be most optimal. In these instances, optimal may refer to having an ability (e.g., processing power, capacity, memory, and/or other characteristics) to process the event processing request within a predetermined period of time (which may, e.g., be included in the parameters) for the lowest cost, and these various edge computing systems may be located in various different geographic regions. For example, the parameters and historical edge computing processing information (e.g., indicating which edge computing systems processed events with certain parameters and the corresponding energy cost information, such as historical prices of both green and non-green energy sources that support the corresponding edge computing systems) may be fed into the global optimization model. In some instances, green energy sources (which may, as described herein, include other clean/renewable energy sources) may include energy received from sources considered renewable and/or clean (e.g., wind, solar, hydro, and/or other energy sources), whereas non-green energy sources may include sources from fossil fuel (e.g., oil, coal, natural gas, and/or other energy sources). Similarly, a dynamic link between various edge computing systems (e.g., first edge computing system 104, second edge computing system 105, and/or other edge computing systems) may be established so as to enable the energy optimization platform 102 to dynamically monitor processing conditions (e.g., processing power, capacity, memory, processing load, and/or other information) for the various edge computing systems. In doing so, the global energy optimization model may be trained to identify first, which edge computing systems are able to process a given event processing request at a given time, and second, of these identified edge computing systems, which may be the least expensive.

In some instances, the global energy optimization model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing, hybrid quantum computing, and/or other models.

At step 202, the first edge computing system 104 and/or the second edge computing system 105 may train local energy optimization models. For example, the first edge computing system 104 and/or the second edge computing system 105 may train local energy optimization models to identify, for a given event processing request, the most cost effective mix of energy for use in processing the request. To do so, historical event processing requests, the corresponding parameters (e.g., as described above at step 201), energy cost trends (e.g., from various energy sources configured to support the corresponding edge computing system), user preference information (e.g., a preference for particular green energy sources, or the like), weather information, energy source information, climate information, and/or other information may be fed into the local energy optimization models to configure the local energy optimization models to identify an optimal (e.g., most cost effective or most tailored to specific user preferences) mix of energy sources for use in processing the request. In some instances, this optimal mix of energy sources may include both green and non-green sources of energy.

In some instances, a dynamic link between various edge computing systems (e.g., first edge computing system 104, second edge computing system 105, and/or other edge computing systems) and the various corresponding energy sources may be established so as to enable the edge computing systems to dynamically monitor energy conditions (e.g., production capacity, cost, and/or other information) for the various energy sources.

In some instances, the local energy optimization models may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing, hybrid quantum computing, and/or other models. Although depicted as separate local energy optimization models at each of the first edge computing system 104 and the second edge computing system 105, in some instances, a single local energy optimization model may be trained and ultimately pushed to each edge computing system, which may then continue to dynamically refine their corresponding models based on information specific to a location of the given edge computing system.

Additionally or alternatively, the local optimization model(s) may be included within the global energy optimization model and/or otherwise maintained/trained by the energy optimization platform 102. In these instances, the output from the local energy optimization models may be produced by the energy optimization platform 102, and sent to the corresponding edge computing system(s) accordingly. Similarly, in some instances, the edge computing systems may be integrated into the energy optimization platform 102, and thus any actions described herein as being performed by the edge computing systems may, in some instances, be performed by the energy optimization platform 102.

At step 203, the user device 103 may establish a connection with the energy optimization platform 102. In some instances, the user device 103 may establish a first wireless data connection with the energy optimization platform 102 to link the user device 103 to the energy optimization platform 102 (e.g., in preparation for sending event processing requests). In some instances, the user device 103 may identify whether there is already a connection with the energy optimization platform 102. If there is already an existing connection with the energy optimization platform 102, the user device 103 might not re-establish the connection. Otherwise, if there is not already an existing connection with the energy optimization platform 102, the user device 103 may establish the first wireless data connection as described herein.

At step 204, the user device 103 may send an event processing request to the energy optimization platform 102. For example, the user device 103 may send a request to execute stock trades, fund transfers, balance inquiries, mortgage applications, loan applications, and/or execute other functions. In some instances, the user device 103 may send the event processing request based on receiving input from a user via an interface of the user device 103.

In some instances, the user device 103 may send, along with the event processing request, parameters of the event processing request. For example, the user device 103 may send any value information (e.g., amount of shares, monetary value, fiat amount, cryptocurrency amount, and/or other value information), time constraints (e.g., processing deadline, or other time information), processing preference information (e.g., whether to use only green energy for processing, or other specified energy mix information), an amount of processing power needed to process the event, and/or other information.

In instances where processing preference information is sent, this may, in some instances be based on a user preference profile, which may, e.g., be configured and/or modified based on user input received via an interface of the user device (e.g., during a user registration process or otherwise). For example, a user may configure energy preferences by selecting, deselecting, and/or otherwise modifying a list of energy types (e.g., solar, wind, hydro, geothermal, fossil fuel, nuclear, and/or other types) to be used in processing events for the user. For example, a table of acceptable energy types may be stored and associated with each user's user preference profile. Corresponding users may provide input that causes these acceptable energy types to be removed or added from the table, which may, e.g., cause the table/user preference profile to be modified. In some instances, the user device may send the event processing request while the first wireless data connection is established.

At step 205, the energy optimization platform 102 may receive the event processing request sent at step 204. In some instances, the energy optimization platform 102 may cause a table of acceptable energy types/user preference profile to be updated based on any user preference information included in the event processing request. In some instances, the energy optimization platform 102 may receive the event processing request via the communication interface 113 and while the first wireless data connection is established.

Figure 2B:
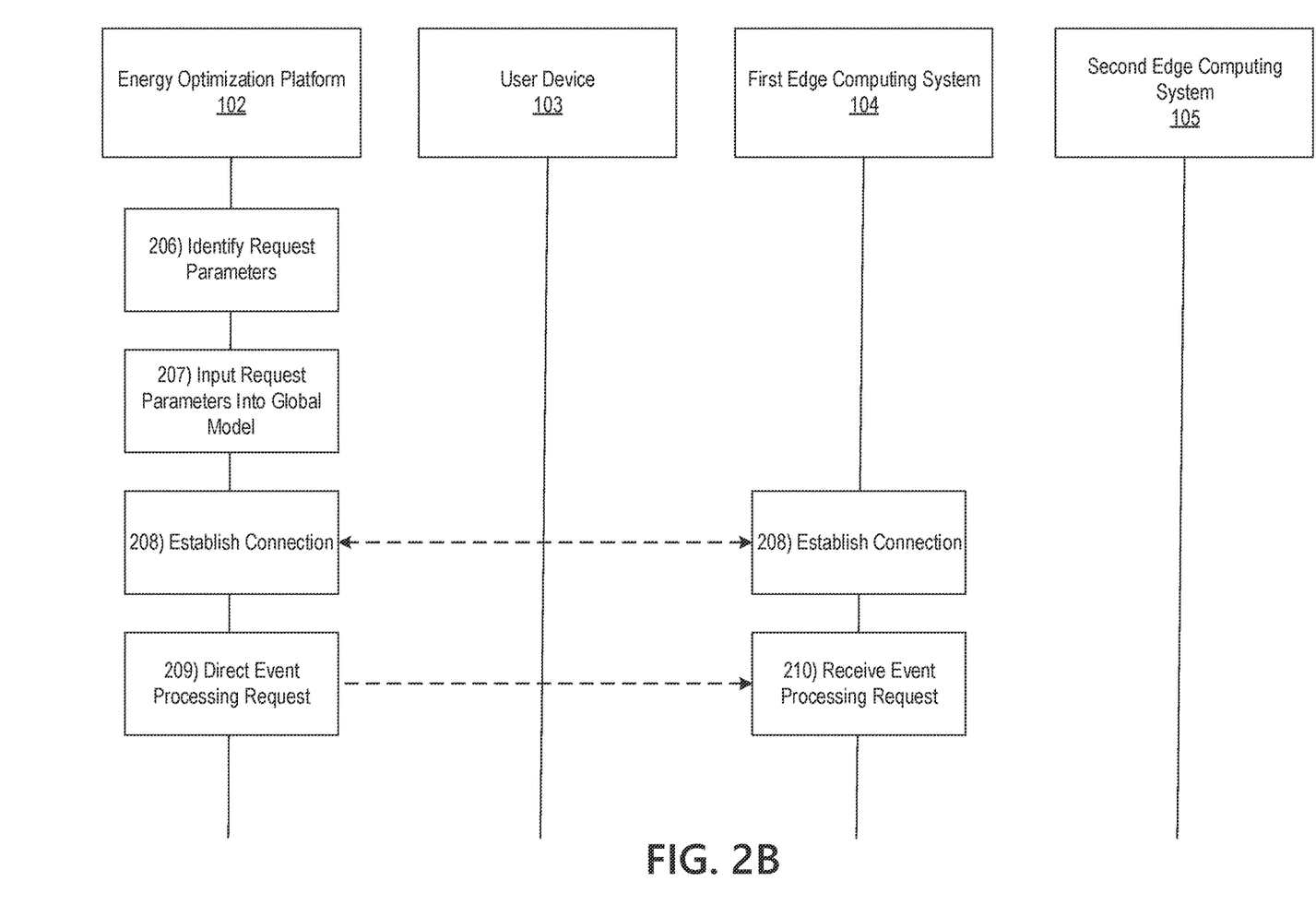

Referring to FIG. 2B, at step 206, the energy optimization platform 102 may identify parameters of the event processing request. For example, the energy optimization platform 102 may identify necessary processing power, time limitations, value, event type, energy preference information, key performance indicators, and/or other information. In some instances, the energy optimization platform 102 may assign a priority value, which may then be input into the various models described below, for the event processing request (e.g., based on any time limitations).

At step 207, the energy optimization platform 102 may input the parameters of the event processing request into the global energy optimization model. In doing so, the energy optimization platform 102 may identify/output whether or not the event processing request may be routed for edge processing. For example, the energy optimization platform 102 may compare the time limitations to the time limitation threshold of the global energy optimization model. Specifically, the energy optimization platform 102 may have several known types of events that must be processed at a rate that might not permit edge computing, such as stock trades, for which processing must occur in near immediate terms. In contrast, however, the energy optimization platform 102 may have other types of events that may have a longer latency tolerance, such as mortgage application processing, backend report generation, and/or other events, for which edge processing may be feasible. If the energy optimization platform 102 identifies that the time information does not exceed the time limitation threshold, the energy optimization platform 102 may cause the event processing request to be locally processed. Otherwise, if the energy optimization platform 102 identifies that the time information does meet or exceed the time limitation threshold, the energy optimization platform 102 may identify an edge computing system at which to process the event processing request.

For example, the energy optimization platform 102 may use the global optimization model to identify an optimal edge computing system at which to process the event processing request (e.g., an edge computing system that may process the event processing request within the corresponding time limitation for the lowest energy cost). The energy optimization platform 102 may identify these edge computing systems available for processing the event processing request in a timely manner by identifying edge computing systems with available computing capacity to process the event processing request within the time limitation based on the processing power needed to process the event processing request. Once these available edge computing systems have been identified, the energy optimization platform 102 may identify an amount of energy needed to process the event processing request, and may identify a corresponding cost of producing that amount of energy for each of the identified edge computing systems configured to process the event processing request within the corresponding time frame (e.g., based on historical energy cost information).

In some instances, the energy optimization platform 102 may also take into account any weather or environmental patterns that may impact processing of the event. For example, availability of solar power may fluctuate based on time of day in a particular region, but may always be available in some region (e.g., as movement of the sun is followed). Accordingly, in these instances, the energy optimization platform 102 may consider such patterns so as to select various edge computing systems in a pattern that follows the sun. Similar techniques may be used to identify edge computing systems from East to West and North to South across the globe, which may, e.g., be configured to provide the largest amount of a particular energy source (e.g., not limited only to solar, but to other energy sources as well). In some instances, by tracing environmental patterns in this way, the energy optimization platform 102 may help to minimize the cost of energy used to process the requested event.

Once identified, the energy optimization platform 102 may rank these edge computing systems, and select the top ranked edge computing systems. For illustrative purposes, it may be assumed that the energy optimization platform 102 may identify, using the global optimization model, that the first edge computing system 104 may be more optimal for processing the event processing request than the second edge computing system 105.

At step 208, the energy optimization platform 102 may establish a connection with the first edge computing system 104. For example, the energy optimization platform 102 may establish a second wireless data connection with the first edge computing system 104 to link the energy optimization platform 102 with the first edge computing system 104 (e.g., in preparation for directing event processing requests). In some instances, the energy optimization platform 102 may identify whether a connection is already established with the first edge computing system 104. If a connection is already established with the first edge computing system 104, the energy optimization platform 102 might not re-establish the connection. If a connection is not yet established with the first edge computing system 104, the energy optimization platform 102 may establish the second wireless data connection as described above.

At step 209, the energy optimization platform 102 may direct the event processing request to the first edge computing system 104. For example, the energy optimization platform 102 may direct the event processing request to the first edge computing system 104 via the communication interface 113 and while the second wireless data connection is established.

Although the event processing request is depicted as being sent to a single edge computing system for processing, it may, in some instances, be split, and multiple portions, tasks, or jobs of the event processing request may be distributed to different edge computing systems for processing. Similarly, in some instances, only a portion of the event processing request may be sent for edge processing, whereas the other portion may be locally processed.

At step 210, the first edge computing system 104 may receive the event processing request sent at step 209. For example, the first edge computing system 104 may receive the event processing request while the second wireless data connection is established.

Figure 2C:
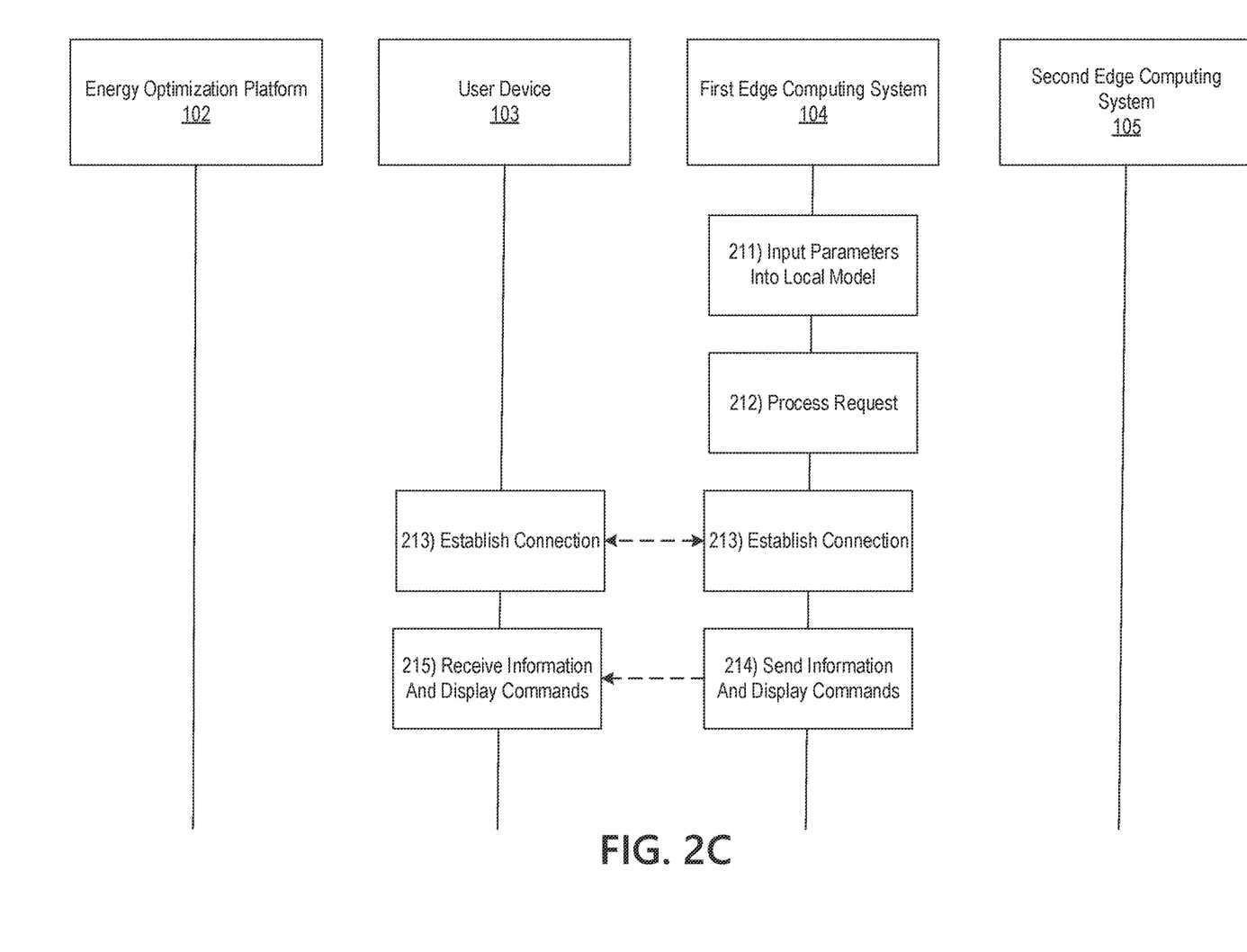

Referring to FIG. 2C, at step 211, the first edge computing system 104 may input the parameters of the event processing request into the local energy optimization model at the first edge computing system 104. For example, the local energy optimization model may identify an amount of energy needed to process the event processing request, and may identify various mixes of energy sources configured to provide the corresponding energy. In some instances, the local energy optimization model may rank these energy sources according to energy cost. In some instances, in doing so, the local energy optimization model may take into account whether a given energy source produces storable energy, or whether the energy produced may be available only temporarily for use. In these instances, such factors may be considered by the local energy optimization model so as to reduce wasted energy by ensuring the timely use of any energy for which storage is not available. In some instances, the local energy optimization may further rank these energy sources according to any user preferences. For example, if the user specified a preference for green energy sources, any green energy sources may be ranked, for example, higher than fossil fuel or other sources. Otherwise, if the user specified a preference for a lowest cost solution, the energy sources may be ranked based on cost. Once ranked, the local energy optimization model may output the highest ranked mix of energy sources. In some instances, the mix of energy sources may include a single energy source, or multiple energy sources.

In some instances, each edge computing system may be configured with a hierarchy of energy sources to be used if available. For example, the first edge computing system 104 may be located in a region where solar power is the least expensive energy, fossil fuel is second, and wind power is third. In these instances, the first edge computing system 104 may identify that all available solar power should be used in processing the event processing request until depleted, at which point, fossil fuel should be used, and so on. In some instances, the first edge computing system 104 may dynamically adjust this hierarchy on a regular basis (e.g., hourly, daily, weekly, etc.) based on weather patterns, environmental factors, and/or other information. For example, the first edge computing system 104 may adjust for solar power to be used only during daylight hours, or the like.

At step 212, the first edge computing system 104 may process the request using the identified mix of energy sources. For example, the first edge computing system 104 may execute the fund transfer, stock trade, mortgage approval process, loan approval process, cryptocurrency transaction, and/or other event using the identified mix of energy sources. In some instances, the first edge computing system 104 may communicate with energy distribution systems corresponding to the mix of energy sources, so as to direct those energy sources to provide the necessary energy (which may, e.g., cause these energy sources to provide the energy). Additionally or alternatively, the first edge computing system 104 may receive energy from a variety of energy sources, not specifically limited to the mix of energy sources, but then may use exclusively energy from the mix of energy sources to process the event processing request.

At step 213, the first edge computing system 104 may establish a connection with the user device 103. For example, the first edge computing system 104 may establish a third wireless data connection with the user device 103 to link the first edge computing system 104 to the user device 103 (e.g., in preparation for sending event processing information). In some instances, the first edge computing system 104 may identify whether a connection is already established with the user device 103. If a connection is already established with the energy optimization platform 102, the first edge computing system 104 might not re-establish the connection. If a connection is not yet established with the energy optimization platform 102, the first edge computing system 104 may establish the third wireless data connection as described herein.

At step 214, the first edge computing system 104 may send event processing information (e.g., indicating that the requested event was processed, where the event was sent for processing, and the mix of energy used to do so) to the user device 103. For example, the first edge computing system 104 may send the event processing information to the user device 103 while the third wireless data connection is established. In some instances, the first edge computing system 104 may also send one or more commands directing the user device 103 to display the event processing information.

At step 215, the user device 103 may receive the event processing information sent at step 214. For example, the user device 103 may receive the event processing information while the third wireless data connection is established. In some instances, the user device 103 may also receive the one or more commands directing the user device 103 to display the event processing information.

Figure 2D:
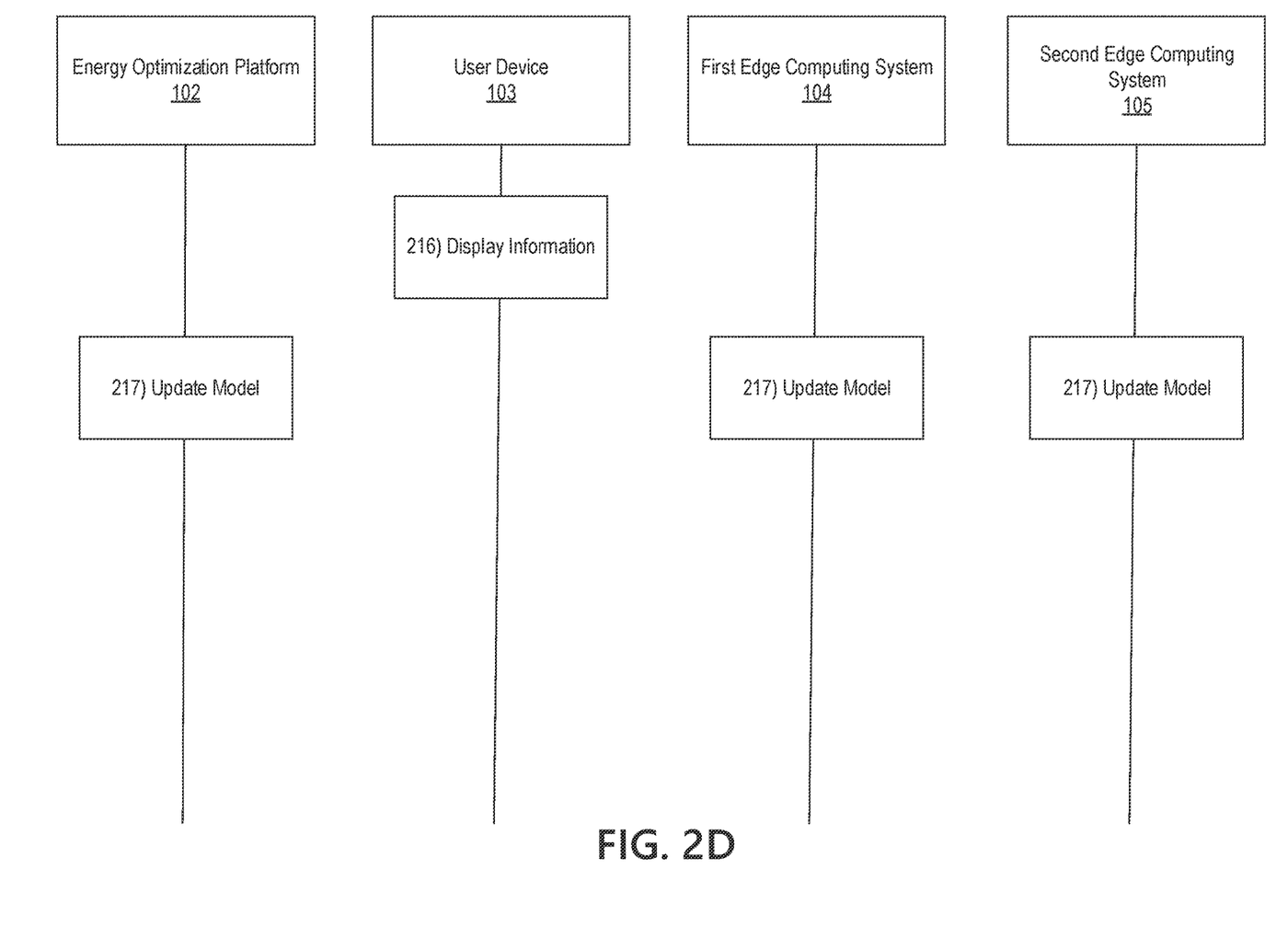
Figure 4:
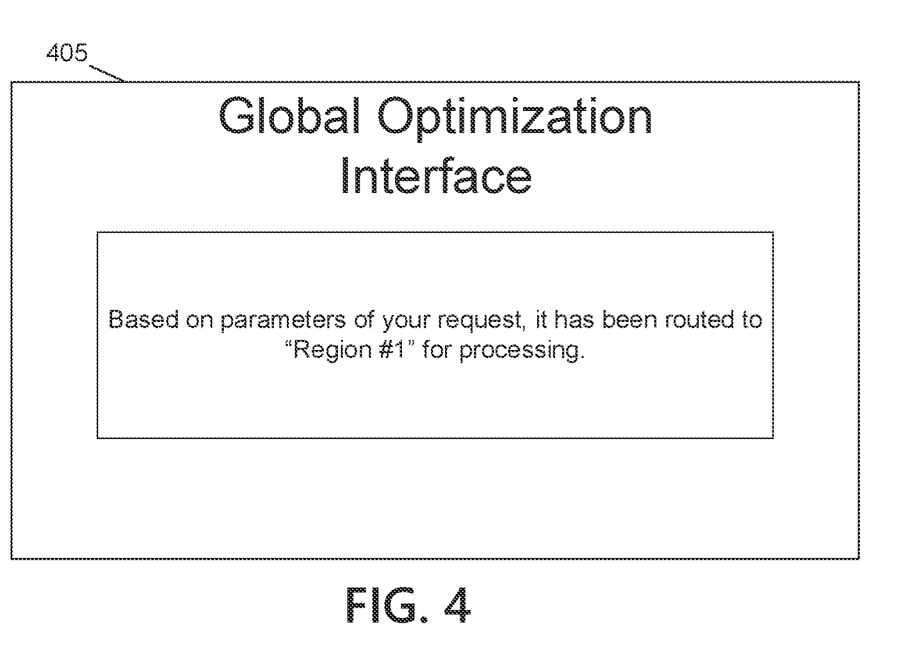
FIGS. 4 and 5 depict illustrative graphical user interfaces for energy optimization using AI and edge computing in accordance with one or more example embodiments.
Figure 5:
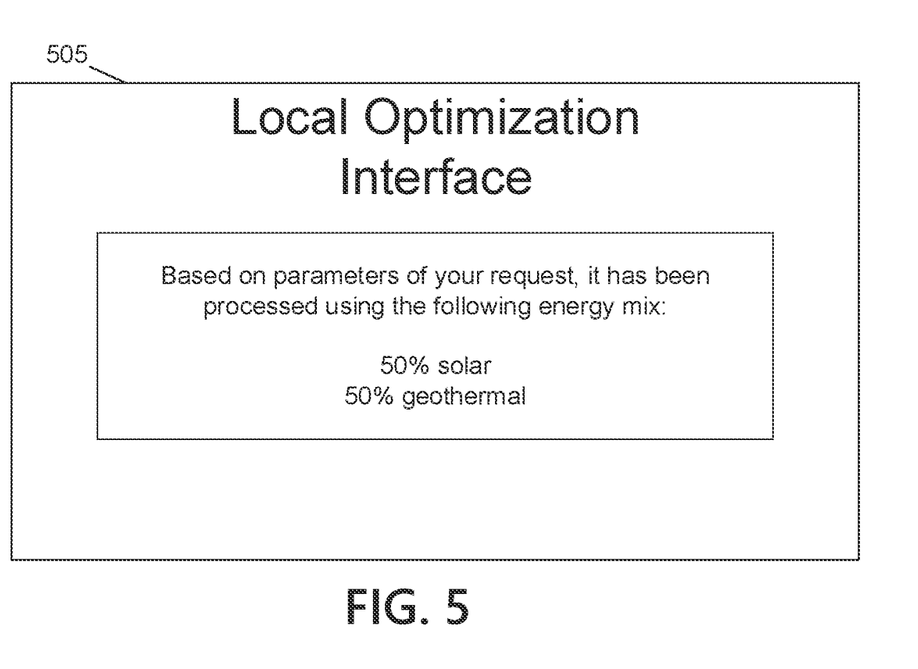

Referring to FIG. 2D, at step 216, based on or in response to the one or more commands directing the user device 103 to display the event processing information, the user device 103 may display the event processing information. For example, the user device 103 may display a graphical user interface similar to graphical user interface 405, which is shown in FIG. 4. For example, the user device 103 may display a graphical user interface indicating a region of the edge computing system used to process the event processing request. Additionally or alternatively, the user device 103 may display a graphical user interface indicating the energy mix used to process the event processing request. For example, the user device 103 may display a graphical user interface similar to graphical user interface 505, which is shown in FIG. 5.

At step 217, the energy optimization platform 102 and/or any edge computing systems may update the global and/or local energy optimization models based on any outputs from the models, user feedback, the parameters, the identified edge computing system (e.g., in this case, selection of the first edge computing system 104), the energy mix, and/or other information. For example, in some instances, user feedback information (e.g., indicating a level of satisfaction with processing speed, the mix of energy sources, and/or other information) may be received. In these instances, this information may be fed back into the models through a continuous and dynamic feedback loop, so as to refine the models and continually improve their accuracy. In some instances, the same feedback information may be used to update all models, or different information may be used to update the various models.

In some instances, the energy optimization platform 102 and/or any edge computing systems may maintain an accuracy threshold corresponding to their models, and may halt refinement of the models where a level of accuracy meets or exceeds the accuracy threshold, so as to conserve bandwidth, processing power, and/or other computing resources. In some instances, these levels of accuracy may be based on the user feedback (e.g., if feedback is received indicating that the user is satisfied, a 1 may be assigned to the corresponding event processing request as feedback, whereas a 0 may be assigned where negative feedback is received). In these instances, a sum of the values may be identified, and then divided by the total number of values. This may provide a decimal value (e.g., the level of accuracy), which may be compared to the accuracy threshold. In some instances, only values for a predetermined time window may be considered (e.g., over the past day, week, month, etc.).

By optimizing selection of energy sources for event processing in this way, energy costs may be minimized on a per request basis without sacrificing processing time. Similarly, in some instances, green energy sources may be substituted for fossil fuel or other energy sources where possible without increasing processing delays or cost.

Figure 3:
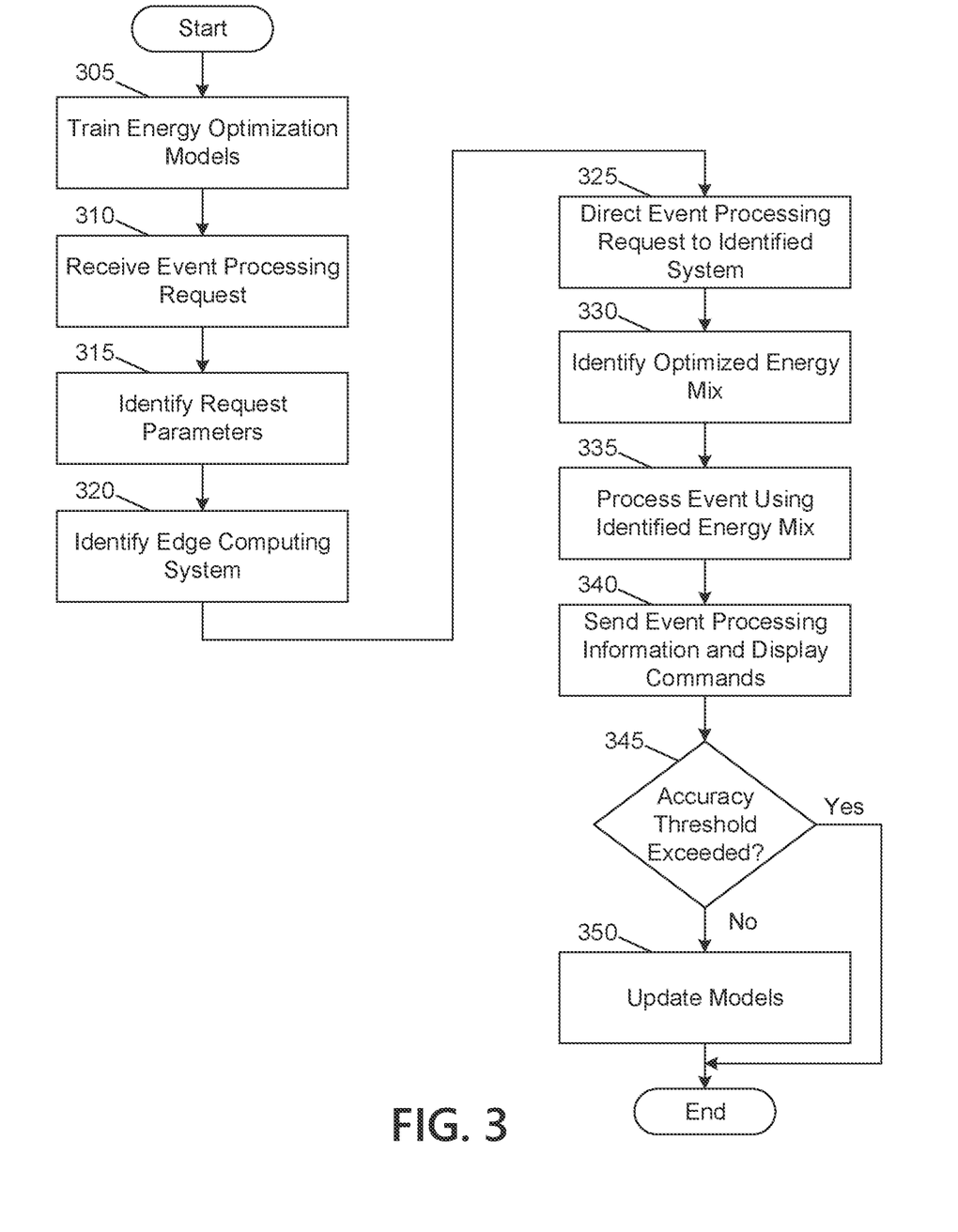
FIG. 3 depicts an illustrative method for energy optimization using AI and edge computing in accordance with one or more example embodiments.

FIG. 3 depicts an illustrative method for energy optimization using AI and edge computing in accordance with one or more example embodiments. Referring to FIG. 3, at step 305, a computing platform having at least one processor, a communication interface, and memory may train one or more energy optimization models. At step 310, the computing platform may receive an event processing request. At step 315, the computing platform may identify parameters of the event processing request. At step 320, the computing platform may identify an edge computing system at which to process the event processing request. At step 325, the computing platform may direct the event processing request to the identified edge computing system. At step 330, the computing platform may identify an optimized energy mix for processing the event processing request. At step 335, the computing platform may process the event using the identified energy mix. At step 340, the computing platform may send event processing information and one or more commands directing a user device to display the event processing information. At step 345, the computing platform may identify whether or not an accuracy threshold for the energy optimization models has been exceeded. If not, the method may end. If the accuracy threshold has not been exceeded, the computing platform may proceed to step 350 to update the one or more energy optimization models.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   one or more processors;
   a communication interface communicatively coupled to the one or more processors; and
   memory storing computer-readable instructions that, when executed by the one or more processors, cause the computing platform to:
   receive a first event processing request;
   identify first parameters of the first event processing request;
   input the first parameters into a global energy optimization model, wherein inputting the first parameters into the global energy optimization model causes the global energy optimization model to identify a first edge computing system and at least a second edge computing system at which to process the first event processing request; and
   route the first event processing request to the first edge computing system along with one or more commands directing the first edge computing system to process the first event processing request using a first energy mix identified by a first local energy optimization model, corresponding to the first edge computing system, wherein sending the one or more commands directing the first edge computing system to process the first event processing request using the first energy mix identified by the first local energy optimization model, causes the first edge computing system to:
- input the first parameters of the first event processing request into the first local energy optimization model to identify the first energy mix, and
- process, using the first energy mix, the first event processing request, wherein the first event processing request is further routed to at least the second edge computing system in a sequential nature that follows a sun, and wherein following the sun causes processing the first event processing request by the at least second edge computing system once solar energy is unavailable at the first edge computing system due to a location of the first edge computing system and a position of the sun.

2. The computing platform of claim 1, wherein the memory stores additional computer-readable instructions that, when executed by the one or more processors, further cause the computing platform to:
- train the global energy optimization model, wherein training the global energy optimization model comprises inputting parameters for historical event processing requests, historical energy pricing information, and historical processing capacity for a plurality of edge computing systems including the first edge computing system.

3. The computing platform of claim 2, wherein the parameters comprise one or more of: time sensitivity, value, and necessary processing power.

4. The computing platform of claim 2, wherein each of the plurality of edge computing systems are located in a different geographic region.

5. The computing platform of claim 1, wherein identifying a first edge computing system at which to process the first event processing request comprises identifying an edge computing system currently configured to process the first event processing request for a lowest cost, when compared to other edge computing systems, within a predetermined timeframe.

6. The computing platform of claim 1, wherein the memory stores additional computer-readable instructions that, when executed by the one or more processors, further cause the computing platform to:
- train one or more local energy optimization models configured to identify, based on parameters of the event processing requests, an energy mix to process the corresponding event processing requests, wherein training the one or more local energy optimization models comprises inputting parameters for historical event processing requests, historical energy pricing information, and historical processing capacity for a plurality of edge computing systems including the first edge computing system.

7. The computing platform of claim 6, wherein the global energy optimization model and the one or more local energy optimization models comprise a single model.

8. The computing platform of claim 6, wherein the plurality of edge computing systems are integrated into the computing platform.

9. The computing platform of claim 1, wherein the first energy mix comprises one or more energy sources, and wherein the one or more energy sources comprise different types of energy sources.

10. The computing platform of claim 1, wherein processing, using the first energy mix, the first event processing request comprises:
- directing one or more energy sources, corresponding to the first energy mix, to provide energy to the computing platform, wherein directing the one or more energy sources to provide the energy to the computing platform causes the one or more energy sources to provide the energy to the computing platform.

11. The computing platform of claim 1, wherein the memory stores additional computer-readable instructions that, when executed by the one or more processors, further cause the computing platform to:
- update, by inputting the first parameters, the first edge computing system, and the first energy mix, the global energy optimization model and the first local energy optimization model.

12. The computing platform of claim 1, wherein the memory stores additional computer-readable instructions that, when executed by the one or more processors, further cause the computing platform to:
- identify that an accuracy level of the global energy optimization model and the first local energy optimization model has reached a threshold accuracy level; and
- based on identifying that the accuracy level has reached the threshold accuracy level, halt updates to the global energy optimization model and the first local energy optimization model until the accuracy level falls below the threshold accuracy level.

13. The computing platform of claim 1, wherein the memory stores additional computer-readable instructions that, when executed by the one or more processors, further cause the computing platform to:
- receive, from a user device, an energy mix preference input, specifying one or more energy sources to be included in the first energy mix, wherein user selection of a particular energy source via a display of the user device causes a backend table of preferred energy sources for the corresponding user to be updated so as to include the particular energy source.

14. The computing platform of claim 1, wherein the memory stores additional computer readable instructions that, when executed by the one or more processors, cause the computing platform to:
- establish a time limitation threshold; and
- compare a processing time associated with the first event processing request to the time limitation threshold, wherein identifying the first edge computing system is in response to identifying that the processing time that meets or exceeds the time limitation threshold, and wherein event processing requests with associated processing times less than the time limitation threshold are not sent for edge processing.

15. The computing platform of claim 1, wherein the first parameters include processing preference information indicating that only renewable energy sources should be used for processing the first event processing request, and wherein identifying the first energy mix comprises selecting only the renewable energy sources despite a less costly source being available.

16. The computing platform of claim 1, wherein the first energy mix includes the use of a first energy source during an initial processing period of the first event processing request and a second energy source during a subsequent processing period of the first event processing request.

17. The computing platform of claim 16, wherein:
the initial processing period comprises a period of daylight,
the first energy source comprises solar energy,
the subsequent processing period comprises non-daylight hours, and
the second energy source comprises a solar energy alternative.

18. A method comprising:
at a computing platform comprising at least one processor, a communication interface, and memory:
receiving a first event processing request;
identifying first parameters of the first event processing request;
inputting the first parameters into a global energy optimization model, wherein inputting the first parameters into the global energy optimization model causes the global energy optimization model to identify a first edge computing system and at least a second edge computing system at which to process the first event processing request; and
routing the first event processing request to the first edge computing system along with one or more commands directing the first edge computing system to process the first event processing request using a first energy mix identified by a first local energy optimization model, corresponding to the first edge computing system, wherein sending the one or more commands directing the first edge computing system to process the first event processing request using the first energy mix identified by the first local energy optimization model, causes the first edge computing system to:
input the first parameters of the first event processing request into the first local energy optimization model to identify the first energy mix, and
process, using the first energy mix, the first event processing request, wherein the first event processing request is further routed to at least the second edge computing system in a sequential nature that follows a sun, and wherein following the sun causes processing the first event processing request by the at least second edge computing system once solar energy is unavailable at the first edge computing system due to a location of the first edge computing system and a position of the sun.

19. The method of claim 18, further comprising:
training the global energy optimization model, wherein training the global energy optimization model comprises inputting parameters for historical event processing requests, historical energy pricing information, and historical processing capacity for a plurality of edge computing systems including the first edge computing system.

20. One or more non-transitory computer-readable media storing instructions that, when executed by a computing platform comprising at least one processor, a communication interface, and memory, cause the computing platform to:
receive a first event processing request;
identify first parameters of the first event processing request;
input the first parameters into a global energy optimization model, wherein inputting the first parameters into the global energy optimization model causes the global energy optimization model to identify a first edge computing system and at least a second edge computing system at which to process the first event processing request; and
route the first event processing request to the first edge computing system along with one or more commands directing the first edge computing system to process the first event processing request using a first energy mix identified by a first local energy optimization model, corresponding to the first edge computing system, wherein sending the one or more commands directing the first edge computing system to process the first event processing request using the first energy mix identified by the first local energy optimization model, causes the first edge computing system to:
input the first parameters of the first event processing request into the first local energy optimization model to identify the first energy mix, and
process, using the first energy mix, the first event processing request, wherein the first event processing request is further routed to at least the second edge computing system in a sequential nature that follows a sun, and wherein following the sun causes processing the first event processing request by the at least second edge computing system once solar energy is unavailable at the first edge computing system due to a location of the first edge computing system and a position of the sun.

* * * * *